(12) United States Patent
Wu et al.

(10) Patent No.: US 10,808,328 B2
(45) Date of Patent: Oct. 20, 2020

(54) SELECTIVE OXIDATION OF FURAN BASED ALCOHOLS VIA ELECTRO-GENERATIVE PROCESS

(71) Applicant: RHODIA OPERATIONS, Paris (FR)

(72) Inventors: Mengjia Wu, Shanghai (CN); Pascal Metivier, Shanghai (CN); Peng Li, Shanghai (CN); Armin T. Liebens, Brussels (BE)

(73) Assignee: RHODIA OPERATIONS, Aubervilliers (FR)

( * ) Notice: Subject to any disclaimer, the term of this patent is extended or adjusted under 35 U.S.C. 154(b) by 89 days.

(21) Appl. No.: 16/062,747

(22) PCT Filed: Dec. 18, 2015

(86) PCT No.: PCT/CN2015/097925
§ 371 (c)(1),
(2) Date: Jun. 15, 2018

(87) PCT Pub. No.: WO2017/101113
PCT Pub. Date: Jun. 22, 2017

(65) Prior Publication Data
US 2018/0363152 A1    Dec. 20, 2018

(51) Int. Cl.
*C25C 3/02* (2006.01)
*C25B 3/02* (2006.01)
*C25B 5/00* (2006.01)
*C25B 9/08* (2006.01)
*H01M 8/06* (2016.01)
*H01M 8/1009* (2016.01)
*H01M 4/92* (2006.01)
*H01M 8/1004* (2016.01)
*H01M 8/1018* (2016.01)

(52) U.S. Cl.
CPC ............ *C25B 3/02* (2013.01); *C25B 5/00* (2013.01); *C25B 9/08* (2013.01); *H01M 4/92* (2013.01); *H01M 8/06* (2013.01); *H01M 8/1004* (2013.01); *H01M 8/1009* (2013.01); *H01M 2008/1095* (2013.01); *H01M 2250/00* (2013.01); *Y02P 70/56* (2015.11)

(58) Field of Classification Search
CPC ... C25B 3/02; C25B 9/08; C25B 5/00; H01M 8/1009; H01M 8/06; H01M 8/1004; H01M 4/92; H01M 2250/00; H01M 2008/1095; Y02P 70/56
See application file for complete search history.

(56) References Cited

U.S. PATENT DOCUMENTS

| | | |
|---|---|---|
| 2012/0059178 A1 | 3/2012 | Sanborn |
| 2013/0137882 A1 | 5/2013 | Borsotti et al. |

FOREIGN PATENT DOCUMENTS

| | | |
|---|---|---|
| CN | 102459214 A | 5/2012 |
| CN | 103068809 A | 4/2013 |
| WO | 2004105166 A2 | 12/2004 |
| WO | 2006074829 A1 | 7/2006 |
| WO | 2008138865 A1 | 11/2008 |
| WO | 2011041800 A1 | 4/2011 |

OTHER PUBLICATIONS

G. R. Dieckmann, et al. ("Selective electrogenerative oxidation of benzyl alcohol with platinum-graphite packed-bed anodes", Journal of Applied Electrochemistry, 27(1): p. 1-8, Jan. 1997.*

Skowronski, et al., "Selective Anodic Oxidation of 5-Hydroxymethylfurfural", Synthesis (1996) vol. 11, pp. 1291-1292.

Chadderdon, et al., "Electrocatalytic oxidation of 5-hydroxymethylfurfural to 2,5-furandicarboxylic acid on supported Au and Pd bimetallic nanoparticles", Green Chemistry (2014) vol. 16, pp. 3778-3786.

* cited by examiner

*Primary Examiner* — J. Christopher Ball

(57) ABSTRACT

This invention concerns a method for the production of at least a furanic compound having at least one aldehyde function and electrical power, by oxidizing at least a furanic compound having at least one hydroxyl function.

14 Claims, 1 Drawing Sheet

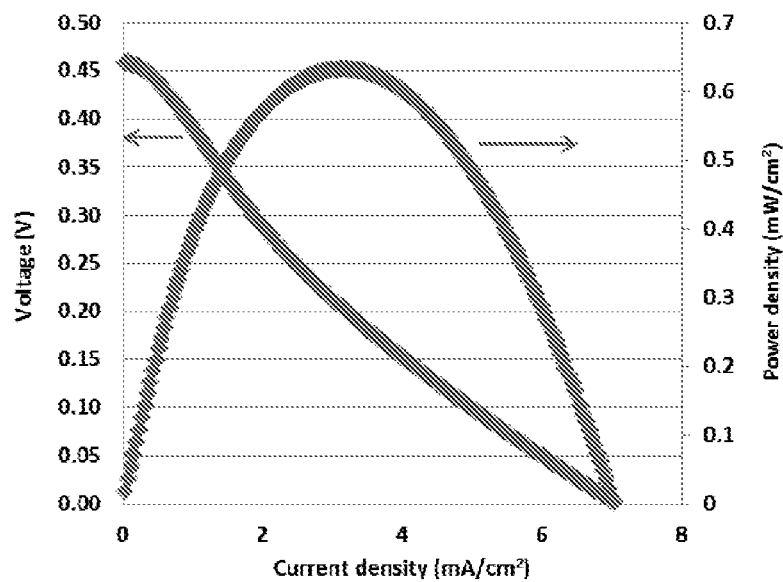

SELECTIVE OXIDATION OF FURAN BASED ALCOHOLS VIA ELECTRO-GENERATIVE PROCESS

This application is a U.S. national phase entry under 35 U.S.C. § 371 of International Application No. PCT/CN2015/097925, filed on Dec. 18, 2015, the entire content of which is explicitly incorporated herein by this reference.

This invention concerns a method for the production of at least a furanic compound having at least one aldehyde function and electrical power, by oxidizing at least a furanic compound having at least one hydroxyl function.

PRIOR ART

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

2,5-furandicarbaldehyde (FDA) is widely used in organic synthesis, such as the synthesis of the symmetrical diamines and Schiff bases of furan series and in various condensation reactions. FDA is also an excellent candidate as monomer for polymeric materials like polymeric Schiff base and furan-urea resin etc.

Hydroxymethylfurfural (HMF) is accessible from biomass and could reduce fossil-fuel based energy consumption. Although many reaction routes have been developed to transfer HMF to FDA or 2,5-furandicarboxylic acid (FDCA), such as homogeneous catalysis, heterogeneous catalysis and enzyme-assisted catalysis, there are still some drawbacks, which need to be solved in these existing methods for a green and sustainable chemistry, mainly due to the inevitable use of toxic solvents, reagents and pressurized gases. In recent years, a great deal of researches on conventional electrochemical catalytic synthesis has been conducted to convert HMF to its selective oxidation products, such as 2,5-furandicarbaldehyde (FDA), 5-hydroxymethylfurancarboxylic acid (HFCA), 2-formyl-5-furancarboxylic acid (FFCA), and 2,5-furandicarboxylic acid (FDCA), which are becoming commercially valuable and have aroused more and more interests. Romuld Skowronski et al. Synthesis 1291-1292 (1996) describes a selective electrochemical oxidation of HMF to FDA at a bulk platinum anode in a biphasic system. David J. Chadderdon et al. Green Chem., 2014(16) 3778-3786 describes the unique catalytic properties of Pd and Au nanoparticles for competitive oxidation of alcohol and aldehyde side-groups presented in HMF. However, in such a conventional electrochemical catalytic process, it is essential and required to provide an external power to drive the reaction to the targeted direction and to maintain a satisfactory kinetics, which results in large energy consumption and low current efficiency.

Fuel cell is a device, which has been used as power generator accompanied by redox reactions at its two electrodes. In conventional fuel cells, the electrochemical oxidation of an appropriate reductant at the anode and oxygen reduction at the cathode produces electric energy. To obtain maximal electric energy, the final products generated from carbon-based fuels by fuel cells are preferred to be carbon dioxide ($CO_2$) and water ($H_2O$). Patent application WO 2011/041800 discloses an environmental friendly process for generating power in a fuel cell with carbon-based fuels, such as primary alcohols, in order to eliminate carbon dioxide release. By this way, primary alcohols are converted to corresponding carboxylic acids or salts. The selectivity of oxidant products has not been considered since the purpose of this application is still electricity generation. Patent application WO 2008/138865 teaches a new way to produce electric energy and selectively oxidize alcohols in Direct Alcohol Fuel Cells (DAFC) under alkaline conditions. It indicates the selectivity could be controlled by proper anode catalysts, working time, voltage and temperature. However, selectively producing FDA from HMF in electro-generative devices like fuel cells or other divided electrochemical cells, such as H-shape electrochemical cells, has never been reported.

INVENTION

The present invention concerns a process for the production of at least a furanic compound having at least one aldehyde function and electrical power, by oxidizing at least a furanic compound having at least one hydroxyl function, wherein the reaction is performed in an electro-generative device having at least an anode, a cathode and a separator, the anode reactant is the furanic compound having at least one hydroxyl function and the cathode reactant is an oxidant.

It is therefore an objective of this invention to provide a method for producing furanic compounds above mentioned via an electro-generative process at green and mild conditions, which notably reduces waste generation and simplifies industrial processes and therefore is more environmentally friendly, costless and safer in comparison with the prior arts. Moreover, method of the present invention consumes no external energy in comparison with conventional electrochemical catalytic oxidation.

Other characteristics, details and advantages of the invention will emerge even more fully upon reading the description which follows.

DEFINITIONS

Throughout the description, including the claims, the term "comprising one" should be understood as being synonymous with the term "comprising at least one", unless otherwise specified, and "between" should be understood as being inclusive of the limits.

It should be noted that in specifying any range of concentration, any particular upper concentration can be associated with any particular lower concentration.

Should the disclosure of any patents, patent applications, and publications which are incorporated herein by reference conflict with the description of the present application to the extent that it may render a term unclear, the present description shall take precedence.

DETAILS OF THE INVENTION

Method of the present invention including Gibbs free energy of redox reaction less than zero, wherein anodic reactant are furanic compounds having at least one hydroxyl function, to generate electricity. $\Delta_R G^\ominus$ is the change of the free reaction enthalpy when the pure reactants are converted into the pure products, being each species in its standard state. The values of standard free enthalpy of formation) ($\Delta_F G^\ominus$ of the reactants i are available in many database, such as NIST Chemistry Webbook, or by theoretical calculations. Therefore, $\Delta_R G^\ominus$ can be easily calculated regarding the stoichiometric factors $v_i$ of each reactant i according to:

$$\Delta_R G^\ominus = [\Sigma v_i \Delta_F G^\ominus$$

The standard equilibrium potential $\Delta E^\theta$ is then calculated with the following equation:

$$\Delta_R G^\theta = nF \Delta E^\theta$$

where $\Delta E^\theta$ is the standard equilibrium potential (V), n is the number of electrons transferred in the reaction and F is the Faraday constant (96,485A·s)

By tuning the electrode potential or current, the composition of the electrolyte, membrane, flow rate, concentration of reactant solution, pH, reaction time, temperature, the catalysts on both electrodes, or the combination of several of the afore mentioned parameters, selectivity of aldehyde could be well controlled.

The system or the process mentioned above is usually call "Electro-generative systems" or electro-generative processes, which combine the favourable thermodynamics of overall reaction ($\Delta_R G^\theta < 0$), where the change in Gibbs' free energy should be negative, with mechanistic and kinetic factors to produce or remove a desired chemical, and to generate DC current between matched electrodes in an electrochemical cell arrangement. According to the present invention, an electro-generative device comprises at least one anode and one cathode which are spaced apart and reside in two compartments, a separator or an ion exchange membrane established between two electrodes.

The furanic compound of the present invention comprises a furan group that is a group of the heterocyclic aromatic series characterized by a ring structure composed of one oxygen atom and four carbon atoms. The simplest member of the furan family is furan itself.

The furanic compound having at least one hydroxyl function of the invention preferably comprises at least one primary hydroxyl function. The furanic compound above mentioned preferably comprises two primary hydroxyl functions.

The furanic compound having at least one hydroxyl function of the present invention may also comprise at least one aldehyde functions. The furanic compound mentioned above may for example comprise one hydroxyl function and one aldehyde function, such as hydroxymethylfurfural (HMF) for instance.

In one embodiment, the furanic compound having at least one hydroxyl function is preferably selected from a group consisting of furfuryl alcohol, hydroxymethylfurfural (HMF) and bis(hydroxymethyl)furan, 5-methoxymethylfurfuryl alcohol, 5-hydroxymethylfurancarboxylic acid, bis(5-hydroxymethylfuranmethyl) ether.

The furanic compound having at least one aldehyde function of the invention preferably comprises two aldehyde functions. Preferably, the furanic compound is selected from a group consisting of furfural, hydroxymethylfurfural and 2,5-furandicarbaldehyde, 5-methoxymethylfurfural, 5-formylfurancarboxylic acid and bis(5-formylmethylfurnmethyl) ether.

In one embodiment, the device may be used in present invention are fuel cells or H-shape cells. Fuel cell applications which are related can be easily distinguished from electro-generative processes, since the maximum generation of power with complete combustion is the prime objective in the conventional fuel cell operations, and little or no consideration is given to recover chemical products. Electro-generative systems share the use of catalytic electrodes and possibly even fuel cell components, but they differ significantly in that their main function is chemical production, and the electrical power is a by-product. The "electro-generative" designation emphasises the chemical processing goals.

A consequence of this is that catalytic requirements and operation conditions at both electrodes may differ considerably from those in fuel cells.

In the method of the present process, anode or cathode catalyst employed comprises at least one noble metal, such as Pt, Pd, Ru, Rh, Au or Ir. Preferably, the anode or cathode catalyst further comprises at least one other metal or non-metal element, other than noble metals above mentioned. Said metal and non-metal element is preferably selected from transition metal element, such as Ru, Rh, Au, Pd, Pt, Ir, Ta, Ni, Ag, Cu, Fe, Mn, Cr, Ti, Co, Zn, Zr, Y, or lanthanides, such as Ce, or other metal, such as Al and non-metal like N, P etc. Particularly, catalyst described above may be applied on a support for better distribution. Carbon or metal oxides are preferable supports, wherein the metal species is chosen from the above.

In one embodiment, Pt could be solely used as anode and cathode catalysts. Preferably, the catalysts further comprise Ru and are supported by Carbon. Catalyst of the present invention could be obtained by commercial purchase from Johnson-Matthey, BASF, Premetek, Evonik etc.

Catalyst described above may be in directly used as an bulk electrode in different shapes, such as sheet, net, foam, foil or belt, or applied to the anode or cathode support by the way of, but not limited to, spreading, wet spraying, powder deposition, electrodeposition, evaporative deposition, dry spraying, decaling, painting, sputtering, low pressure vapour deposition, electrochemical vapour deposition, tape casting or screen printing.

In the method of the present process, supporting electrolyte may be added into anode or cathode compartments. A supporting electrolyte is a substance that promotes the ionic conductivity of the electrolyte solution when dissolved in a polar or nonpolar solvent, such as water or tetrahydrofuran (THF). It is preferred that the electrolyte is inorganic acids or inorganic and organic salts or ionic liquids, which is selected from a group consisting of $H_2SO_4$, $HClO_4$, HTFSI, $HNO_3$, alkali metal salts and alkaline earth metal salts. More preferably, electrolyte is $H_2SO_4$.

Said oxidant is the one, which could be reduced at cathode in the presence of catalysts or bulk catalytic electrodes. Preferably, oxidant is oxygen, air or hydrogen peroxide. More preferably, oxidant is oxygen.

Said reactant at anode may be dissolved in a solvent. The solvent is not particularly limited. Any solvent which has solubility to a specific reactant may be chosen. It is preferred that the solvent is selected from water, acetonitrile (AN), tetrahydrofuran (THF) and acetic anhydride (HOAc) Water is more preferably selected as the solvent due to easy handling and the advantage of no pollution to environment.

Said separator is non-electron conducting and does not preclude appreciably free movement of the electrolyte, solvent, and any liquid anodic or cathodic fuel. Separator is preferably a polymer membrane and is more preferably ion exchange membrane and Nafion proton membrane is most preferably. Thickness of membrane is preferably from 100-300 μm.

In the method of the present process, the concentration of reactant solution is preferably from 0.01 mol/L to 5 mol/L. In one embodiment, when anode reactant is HMF, the concentration is preferably from 0.02 mol/L to 2 mol/L.

In the method of the present process, the pH of anode reactant solution is preferably between 0.01-7.

In the method of the present process, the liquid reactants or solution previously described could be pumped into the compartments in fuel cell type reactor. It is preferable that the flow rate is comprised between 0.1 to 20 ml/min.

In the method of the present process, the reaction is performed at a temperature range usually comprised between 10 to 200° C. In one embodiment, the reaction temperature is preferably between 30-60° C.

In the method of the present process, the reaction time is generally between 0.5 hours and 50 hours, preferably between 15 hours and 45 hours.

Desired potential could be obtained by tuning the composition of the electrolyte, membrane, flow rate, concentration of reactant solution, pH, reaction time, temperature, the catalysts on both electrodes, or the combination of several of the afore mentioned parameters. In one embodiment, to selectively produce aldehyde or ketone compound by the method of the present process, especially when anode reactant is HMF, the generated potential is preferably between 0.001-0.5 V.

The following examples are included to illustrate embodiments of the invention. Needless to say, the invention is not limited to the described examples.

BRIEF DESCRIPTION OF DRAWINGS

FIG. 1 Polarization curves obtained under the conditions in Example 1.

EXPERIMENTAL PART

Example 1

The designed electrode reactions under acidic conditions are shown as below

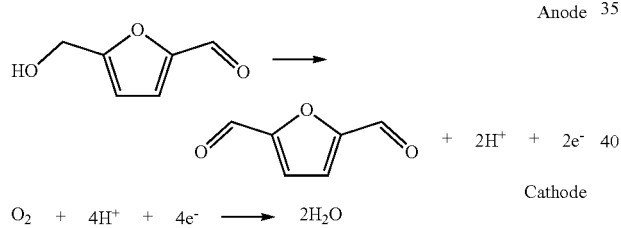

The theoretical calculation gives standard Gibbs energy of the reaction with −189.11 kJ/mol, and the theoretical generated voltage is 0.98V.

The anode reactant, HMF, was dissolved into water to get a 0.1 M solution with the addition of 0.1 M $H_2SO_4$ to reach a pH of 0.99. It was fed to anode compartment of a standard PEMFC (polymer exchange membrane fuel cells) with a flow rate of 10 ml/min in a closed loop.

The cathode reactant, oxygen, was fed to cathode compartment of the same fuel cell with a flow rate of 100 sccm under 1 bar.

2 mg/cm$^2$ PtRu and Pt catalysts were coated on carbon cloth respectively and then hot pressed to make a membrane electrode assembly (MEA) with Nafion in the middle as proton exchange membrane.

The reaction was performed by heating both anode and cathode to 50° C. for 41 hours.

Under the above conditions, the reaction could reach an open circuit voltage of 0.47 V, and a maximum power density of 0.64 mW/cm$^2$, as shown in FIG. 1. To allow faster reaction rate, the cell was short circuit connected for 41 hours.

After reaction, the final solution was quantitatively studied by HPLC. The main product was identified to be 2,5-furandicarbaldehyde (FDA) with a selectivity of 80% and a yield of about 40%. The conversion of HMF was 51%.

Example 2

The anode reactant, HMF, was dissolved into water to get a 0.1 M solution with the addition of 0.1 M $H_2SO_4$ to reach a pH of around 1. It was fed to anode compartment of a standard PEMFC (polymer exchange membrane fuel cells) with a flow rate of 1 ml/min in a closed loop.

The cathode reactant, oxygen, was fed to cathode compartment of the same fuel cell with a flow rate of 100 sccm under 1 bar.

2 mg/cm$^2$ PtRu and Pt catalysts were coated on carbon cloth respectively, and then hot pressed to make a membrane electrode assembly (MEA) with Nafion (DuPont) proton exchange membrane with thickness of 178 μm.

The reaction was performed by heating both anode and cathode to 50° C. for 41 hours.

TABLE 1

Reaction results of electro-generative oxidation from HMF to FDA by using Nafion membrane with thickness of 178 μm.

| Membrane thickness (μm) | Power generation | HMF conversion (%) | Selectivity (%) | | | |
|---|---|---|---|---|---|---|
| | | | FDA | HFCA | FFCA | FDCA |
| 178 | 415 mV, 214 μW/cm$^2$ | 46.3 | 87.3 | 3.4 | 9.0 | 0.3 |

Example 3

For acidic conditions, Pt and Pt—Ru catalysts have been tested for HMF oxidation, by using Nafion proton exchange membrane. The anode reactant, HMF, was dissolved into water to get a 0.1 M solution with the addition of 0.1 M $H_2SO_4$ to reach a pH of around 1. It was fed to anode compartment of a standard PEMFC (polymer exchange membrane fuel cells) with a flow rate of 5 ml/min in a closed loop.

The cathode reactant, oxygen, was fed to cathode compartment of the same fuel cell with a flow rate of 100 sccm under 1 bar.

PtRu and Pt were used for anode catalysts and Pt was used for cathode catalyst. 2 mg/cm$^2$ PtRu and Pt catalyst were used for HMF oxidation, and were coated on carbon cloth to form anode, respectively. The cathode was coated with Pt catalyst for $O_2$ reduction. Both electrodes were hot pressed to make a membrane electrode assembly (MEA) with Nafion (DuPont) proton exchange membranes in between.

The anode and cathode were short circuited for the reaction at 50° C. for 41 hours.

TABLE 2

Summary of reaction results of electro-generative oxidation of HMF to FDA under acidic conditions by using a proton exchange membrane and different catalysts.

| Catalyst on Anode | Power generation | HMF conversion (%) | Selectivity (%) | | | |
|---|---|---|---|---|---|---|
| | | | FDA | HFCA | FFCA | FDCA |
| Pt | 156 mV 90 μW/cm² | 34.1 | 76.7 | 1.4 | 19.9 | 2.0 |
| PtRu | 381 mV 102 μW/cm2 | 50.9 | 79.8 | 1.6 | 18.1 | 0.5 |

Example 4

The anode reactant, HMF, was dissolved into water to get a 0.1 M solution with the addition of 0.1 M $H_2SO_4$ to reach a pH of around 1. It was fed to anode compartment of a standard PEMFC (polymer exchange membrane fuel cells) with a flow rate of 5 ml/min in a closed loop.

The cathode reactant, oxygen, was fed to cathode compartment of the same fuel cell with a flow rate of 100 sccm under 1 bar.

2 mg/cm² PtRu and Pt catalyst were coated on carbon cloth respectively, and then hot pressed to make a membrane electrode assembly (MEA) with Nafion (DuPont) proton exchange membranes with thickness of 177 μm.

The reaction was performed by heating both anode and cathode to 50° C. for 16 hours.

TABLE 3

Reaction results of electro-generative oxidation of HMF to FDA at 16 hours.

| Time (hrs) | Power generation | HMF conversion (%) | Selectivity (%) | | | |
|---|---|---|---|---|---|---|
| | | | FDA | HFCA | FFCA | FDCA |
| 16 | 100 mV, 30 μW/cm² | 25.5 | 87.9 | 2.0 | 9.9 | 0.2 |

Example 5

The anode reactant, HMF, was dissolved into water to get a 0.1 M solution with the addition of 0.1 M $H_2SO_4$ to reach a pH of around 1. It was fed to anode compartment of a standard PEMFC (polymer exchange membrane fuel cells) at a flow rate of 5 ml/min in a closed loop.

Two cathode reactants, oxygen and air, were studied as cathode fuel, respectively, which was supplied to cathode compartment at a flow rate of 100 sccm under 1 bar.

2 mg/cm² PtRu and Pt catalyst were coated on carbon cloth respectively, and then hot pressed to make a membrane electrode assembly (MEA) with Nafion (DuPont) proton exchange membranes with thickness of 177 μm.

The reaction was performed by heating both anode and cathode to 50° C. for 41 hours.

TABLE 4

Summary of reaction results with different oxidant for electro-generative oxidation of HMF to FDA.

| Oxidant | Power generation | HMF conversion (%) | Selectivity (%) | | | |
|---|---|---|---|---|---|---|
| | | | FDA | HFCA | FFCA | FDCA |
| air | 185 mV, 84 μW/cm² | 37.8 | 81.8 | 2.2 | 15.5 | 0.5 |
| $O_2$ | 381 mV 102 μW/cm2 | 50.9 | 79.8 | 1.6 | 18.1 | 0.5 |

Example 6

In this example, an H-shape electrochemical cell was used for eGen oxidation of HMF to FDA under acidic condition.

The anode reactant, HMF, was dissolved into water to get a 0.1 M solution with the addition of 0.1 M $H_2SO_4$ to reach a pH of around 1. It was fed into anode compartment of a standard H-cell. PtRu catalyst was coated on carbon cloth, and then used as anode for HMF oxidation.

The cathode compartment was also filled with 0.1 M $H_2SO_4$ solution. Air was bubbled into the solution at 200 ml/min. Pt mesh was used as cathode for oxygen reduction.

Nafion proton exchange membrane was placed in the middle of the H-cell, and the two compartments were fixed as a whole cell.

The two electrodes were short circuited for the reaction at 35° C. for 17 hours.

Under the above conditions, the reaction could reach an open circuit voltage of 0.1V, and a maximum power density of 18 μW/cm² After reaction, the final solution was quantitatively studied by HPLC. The result showed that the main product was FDA with a selectivity of 90.3%.

The invention claimed is:

1. A process for the production of a furanic compound having at least one aldehyde function and electrical power, by oxidizing a furanic compound having at least one hydroxyl function, wherein the oxidizing is performed in an electro-generative device having an anode, a cathode and a separator, wherein the furanic compound having at least one hydroxyl function is an anode reactant and an oxidant is a cathode reactant.

2. The process according to claim 1, wherein the furanic compound having at least one hydroxyl function is selected from a group consisting of furfuryl alcohol, hydroxymethylfurfural, bis(hydroxymethyl)furan, 5-methoxymethylfurfuryl alcohol, 5-hydroxymethylfurancarb oxylic acid, and bis(5-hydroxymethylfuranmethyl) ether.

3. The process according to claim 1, wherein the furanic compound having at least one aldehyde function is selected from a group consisting of furfural, hydroxymethylfurfural, 2,5-furandicarbaldehyde, 5-methoxymethylfurfural, 5-formylfurancarboxylic acid and bis(5-formylmethylfurnmethyl) ether.

4. The process according to claim 1, wherein the electro-generative device is a fuel cell or H-shape cell.

5. The process according to claim 1, wherein the anode and cathode comprise a catalyst, said catalyst being Pt.

6. The process according to claim 1, wherein the anode and cathode comprise at least one catalyst selected from a group consisting of Ru, Rh, Au, Pd, Pt, Ir, Ta, Ni, Ag, Cu, Fe, Mn, Cr, Ti, Co, Zn, Zr, Y, Ce, Al N, and P.

7. The process according to claim 1, wherein the anode and cathode comprises catalysts applied to a support.

8. The process according to claim 1, wherein an electric potential is generated and is between 0.001-0.5V.

9. The process according to claim 1, wherein the furanic compound having at least one hydroxyl function is dissolved in a solvent with a concentration between 0.01 mol/L to 5 mol/L.

10. The process according to claim 1, wherein the oxidizing is performed for 15-45 hours.

11. The process according to claim 1, wherein the furanic compound having at least one hydroxyl function is dissolved in a solvent with a pH between 0.01-7.

12. The process according to claim 1, wherein the oxidizing is performed at a temperature between 10-200° C.

13. The process according to claim 1, wherein the separator is Nafion proton exchange membrane.

14. The process according to claim 13, wherein the thickness of membrane is between 100-300 μm.

* * * * *